United States Patent
Sanders

(12) United States Patent (10) Patent No.: US 6,186,415 B1
Sanders (45) Date of Patent: Feb. 13, 2001

(54) SUCTION CUP WITH THREADED CAP ATTACHMENT

(76) Inventor: Gary Wade Sanders, 4025 Dawson Dr., Mobile, AL (US) 36619

( * ) Notice: Under 35 U.S.C. 154(b), the term of this patent shall be extended for 0 days.

(21) Appl. No.: 09/339,610

(22) Filed: Jun. 24, 1999

Related U.S. Application Data

(60) Provisional application No. 60/090,752, filed on Jun. 26, 1998.

(51) Int. Cl.[7] ...................................................... B05B 15/06
(52) U.S. Cl. ........................ 239/282; 239/283; 248/206.2
(58) Field of Search .................................. 239/282, 283; 248/206.2, 363; 4/570, 567

(56) References Cited

U.S. PATENT DOCUMENTS

| | | |
|---|---|---|
| 1,985,502 | 12/1934 | Isenberg . |
| 2,095,170 | 10/1937 | Conklin . |
| 2,893,644 | 7/1959 | Holden . |
| 3,228,613 | 1/1966 | Goldstein . |
| 4,093,165 | 6/1978 | Sussman . |
| 4,580,751 | 4/1986 | Panzer . |
| 4,794,025 | 12/1988 | Yamanaka . |
| 4,933,999 | 6/1990 | Mikiya et al. . |
| 4,957,318 | 9/1990 | Blatt . |
| 5,058,220 | 10/1991 | Mikiya . |
| 5,065,973 | 11/1991 | Wang . |
| 5,110,078 | 5/1992 | Gary . |
| 5,381,990 | 1/1995 | Belokin et al. . |
| 5,639,553 | * 6/1997 | Nagai et al. ....................... 248/206.2 |
| 5,651,520 | 7/1997 | Belokin et al. . |

FOREIGN PATENT DOCUMENTS

4136638A1   11/1990  (DE) .

* cited by examiner

*Primary Examiner*—Lisa Ann Douglas

(57) ABSTRACT

The invention is a spray attachment for a hose having a threaded cap wherein the spray attachment has a suction cup attachable to a slick surface such as the outer surface of a car or boat, a flexible, receiving cap defining a flexible cylindrical opening attached to the suction cup; a beveled insertion cap, insert-able within the cylindrical opening; a frictional contact for releasably retaining the insertion cap within the cylindrical opening wherein the frictional contact is the frictional contact between the walls of the flexible cylindrical opening and the outside surface of the beveled insertion cap; and a spray attachment attached to the insertion cap; the spray attachment having a threaded opening for receiving the threaded cap.

6 Claims, 4 Drawing Sheets

SUCTION CUP WITH THREADED CAP ATTACHMENT

PRIORITY STATEMENT

This is a continuation in part of Provisional Patent No. 60/090,752 filed Jun. 26, 1998.

FIELD OF THE INVENTION

The invention applies to hose sprayer attachments. More specifically, the invention applies to hose sprayer attachments having suction cup attachments.

PRIOR ART

Supporting brackets are known for sprayers. See for example U.S. Pat. No. 2,095,170 to Conklin and U.S. Pat. No. 4,580,751 to Panzer. As indicated, these suction devices may release the sprayer. Other devices providing this function are shown in a number of embodiments.

The common features of these prior art patent with the present invention include the fact that all have a suction cup, an attachment means for attaching a sprayer to the suction cup so that it is permanently a part of the base or suction cup and a sprayer attached to a hose.

The differences between the present invention and the prior art are associated with (1) the type of hose attachment which allows the present invention to be used with a standard garden hose, (2) the specific type of attachment means which allows for easy removal of the suction cup from the sprayer and the inexpensive manufacture of the product, (3) the connection of the sprayer to the attachment means and (4) the type of sprayer used.

GENERAL DISCUSSION OF THE INVENTION

The invention is a garden type sprayer which is released from a suction cup attachable to a car, wall or window. Like the disclosed prior art, there is a hose attached to a sprayer and a suction cup. The sprayer may be attached or removed. The sprayer attachment means comprises a beveled sprayer head on the sprayer and a flexible cup receiving the beveled sprayer head as an integral part of the suction cup. Both of these parts separately may be found in the prior art.

The sprayer is a hose type of sprayer which is designed to be attached to a garden hose and is well known in the prior art in many different embodiments. The sprayer is improved by attaching the sprayer to a three way fitting which goes to a jet sprayer which may be turned on or off at a valve and which defines an outer beveled surface which can be received and held or released by the flexible cup portion of the suction cup.

It is therefore an object of the invention to allow a building, car or boat washer to place his hose against the wall or window of the vehicle or structure and retrieve it from that location when needed.

It is a further object of the invention to incorporate a sprayer attachable to a standard garden hose which may be removably attached to a suction cup attached to a vehicle exterior.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DESCRIPTION OF THE PREFERRED EMBODIMENT

Figure 1:
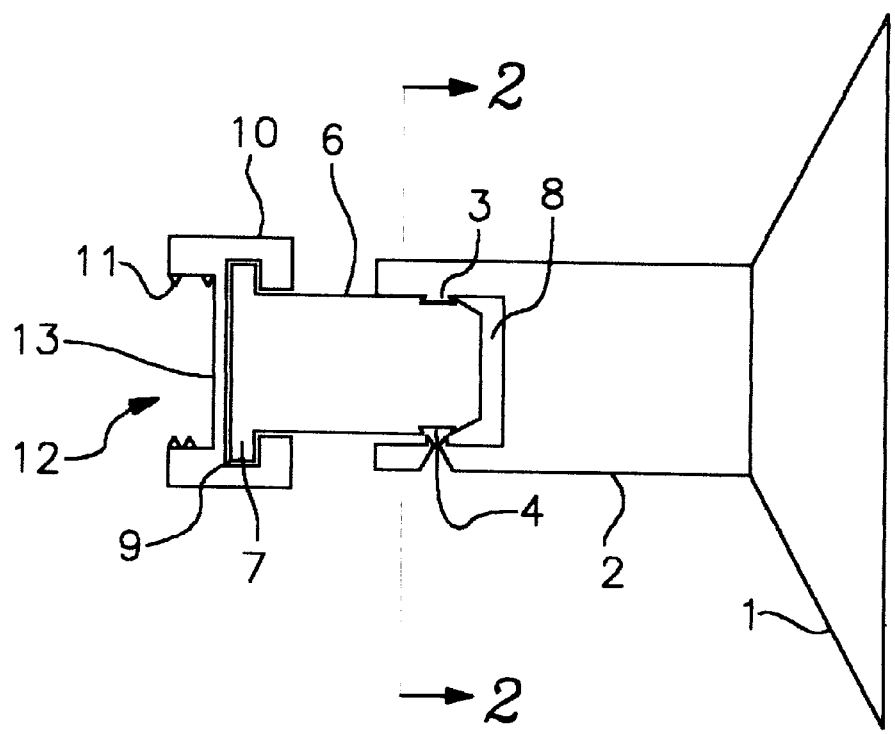
FIG. 1 is a cross sectional view of one embodiment of the invention.

As can best be seen by FIG. 1 the device comprises a suction cup 1 having a receiving cup 2 defining a flexible chamber 8 into which a beveled end 6 of a threaded cap 10 is to be inserted. The beveled end 6 may define a gap 4 into which a flexible protrusion 3 of the of the receiving cup 2 may be inserted to hold the beveled end 6 to the suction cup 1. The contact between the protrusion 3 and the gap 4 is such that the two may be separated to remove the beveled end 6 from the receiving cup 2 so that the suction cup 1 may be left in place.

Figure 2:
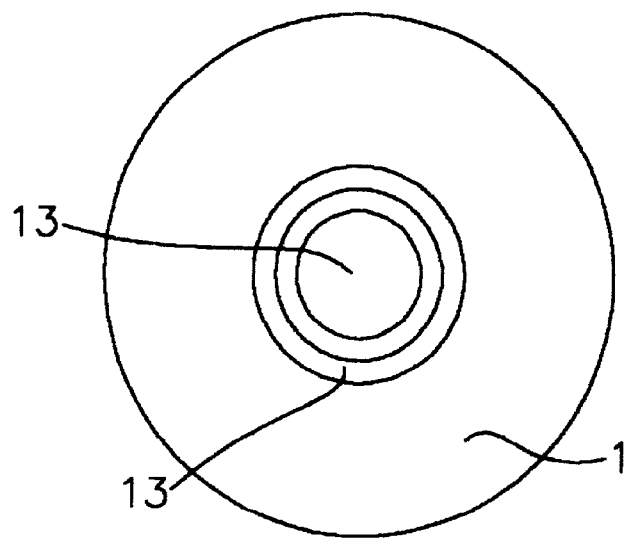
FIG. 2 is a side cross section through the 2—2 axis through FIG. 1.
Figure 3:
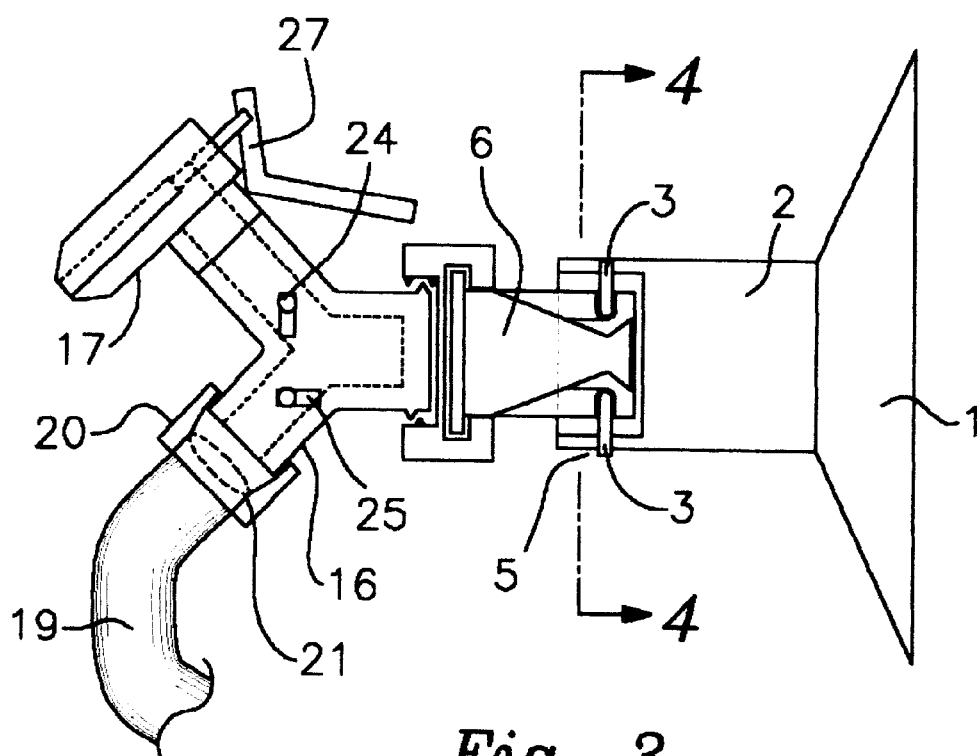
FIG. 3 is a cross sectional side view of an alternate embodiment.
Figure 4:
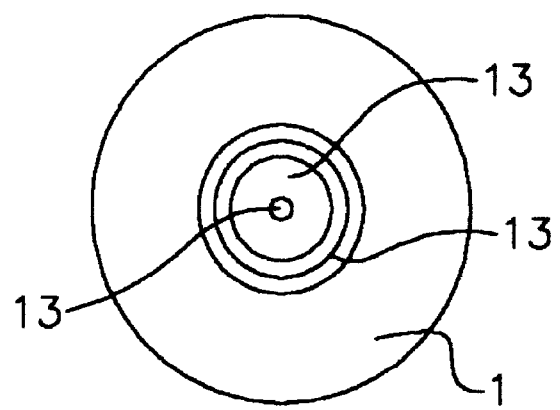
FIG. 4 is a side cross section through the 4—4 axis of FIG. 3.

The hose 19, shown in FIG. 3, is attached to the beveled end 6 by way of the valve 16 by way of the threaded cap 10. The beveled end 6 may be a set sprayer having an opening 13 to the hose 19 may be used and then reattached to the suction cup when not in use for easy holding as shown in FIGS. 3 and 4 or it may be a closed system as shown in FIGS. 1 and 2.

The protrusion 3 may be formed with an opening 4 in the extension 2.

The receiving cup in the form known in the art and is an integral part of the suction cup 1. The standard form is to have a chamber 8 into which the beveled end 6 fits. An elongated area 7 of the beveled end 6 holds the beveled end 6 in a water tight manner to the threaded cap 10.

The threaded cap 10 defines an opening 12 which has threads 11 and a closed face 13. It may also have a washer which is not shown but is known in the art for forming a water tight seal.

As shown in FIG. 3, the arrangement shown in FIG. 1 or the alternate set version in FIG. 3 within the opening 12 a three way valve 16. This three way valve 16 receives a hose 19 by way a hose cap 20. The opposite side of the three way valve 16 receives sprayer 17. The valves 24 and 25 may be turned on an off to control the flow as desired. The sprayer 17 may also have a sprayer 17 in the form known in the art operated by a handle 27 in the manner known in the art.

Figure 5:
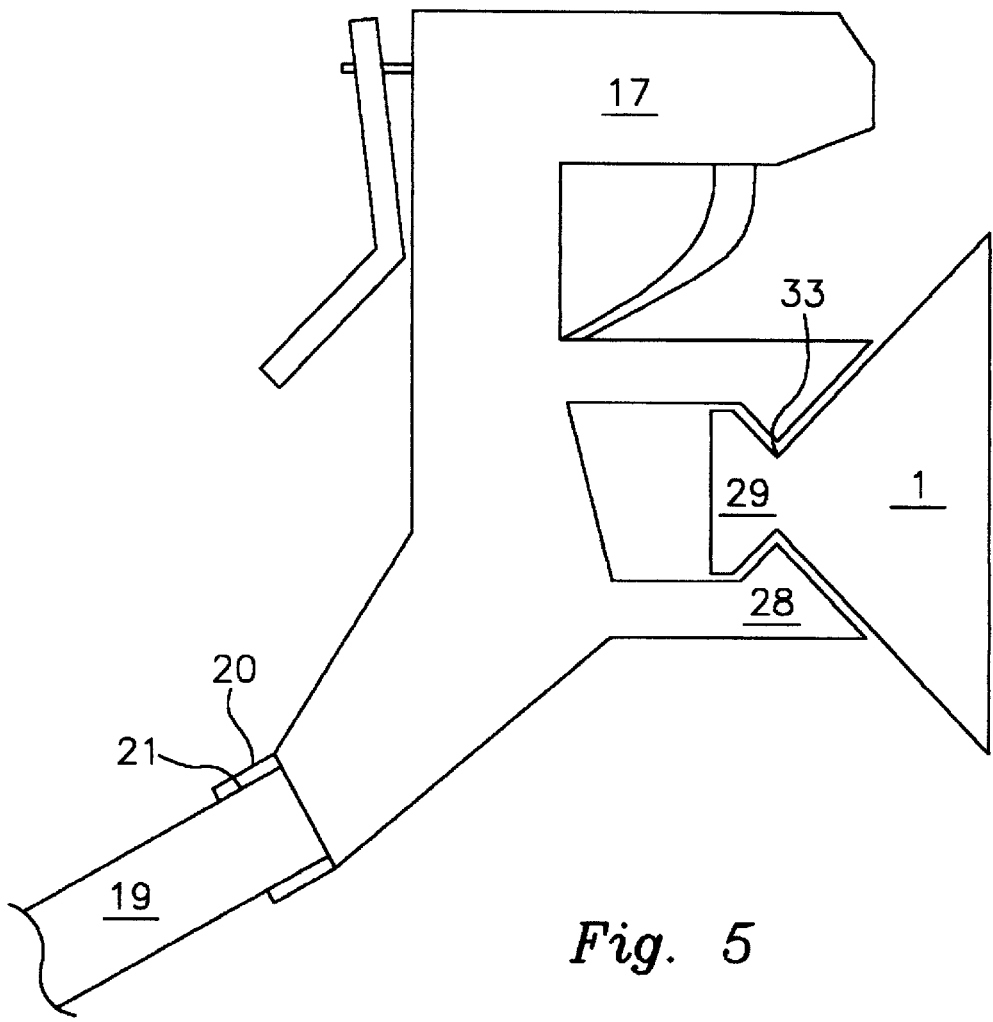
FIG. 5 is a third alternate embodiment.

FIG. 5 shows an alternate embodiment where the suction cup forms a suction cup ridge 29 defining a groove 33 into which a clip 28 integral with the sprayer 17 fits. The hose 19 has a threaded hose end 21 which screws into the hose cap which is also an integral part of the sprayer 17. Either the ridge 29, the clip 28 or both must flex so that the sprayer 17 may be removed and attached to the suction cup 1. The flexing open of the clip 28 may be accomplished by having the clip 28 hinged or by making the clip 28 or ridge or both out of flexible material. The use of flexible material is desired. Of course, the flexible material must be sufficiently resilient to return to the shape which holds the suction cup to the sprayer.

In this way, the valve may be changed as shown in FIG. 5 so that there is a single piece 25, comprising the trigger 24, the handle with sprayer 17 and the hose attachment 20 which defines a clip 28 which fits over a ridge 29 into a groove 33 in a suction cup 1 which may attach as described in the other embodiments. One arm of the clip 28 may also be of flexible material to facilitate the attachment and removal from the suction cup.

The invention therefore as can best be described as a suction cup which may receive a sprayer 17 attached to a garden hose 19.

Figure 6:
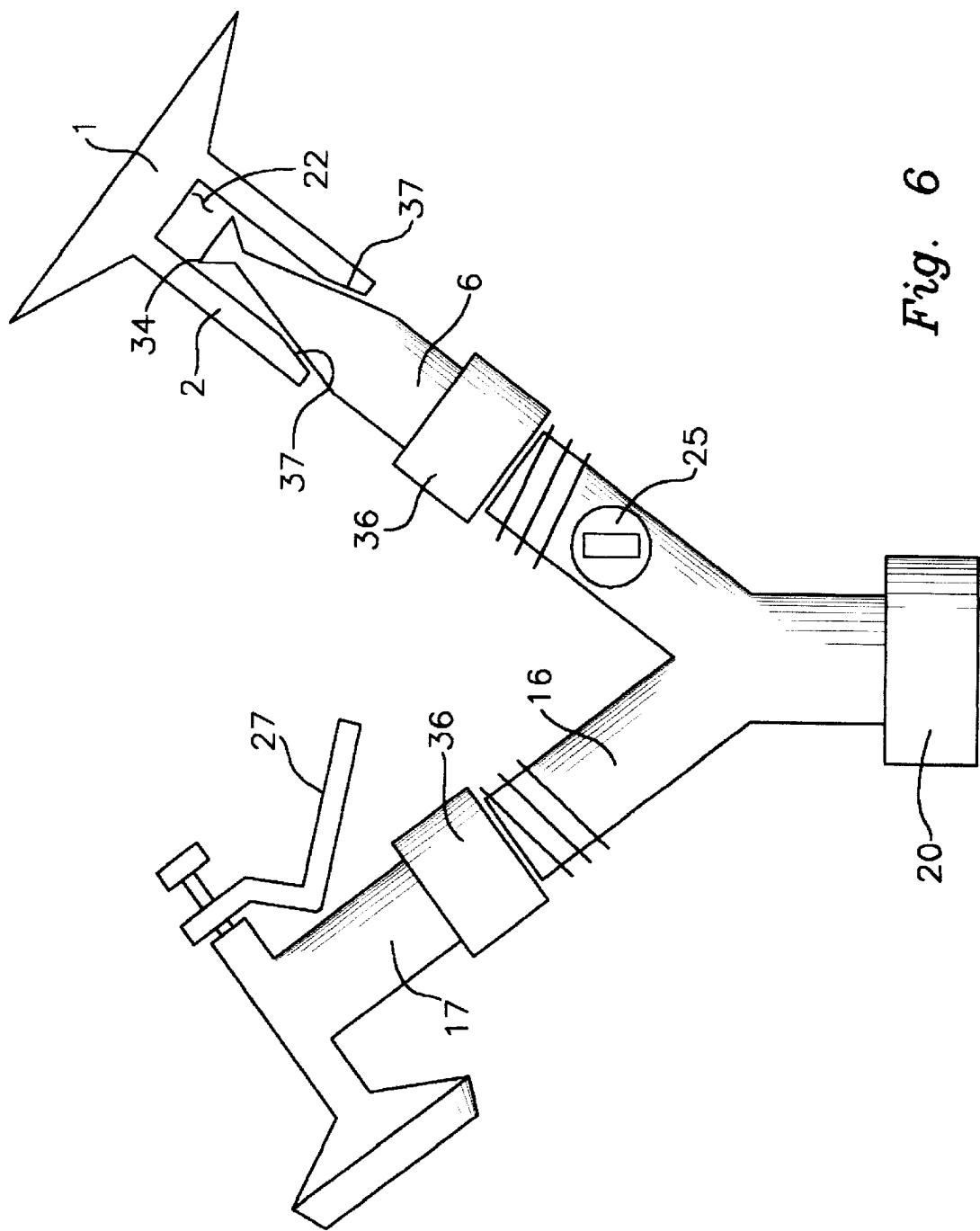
FIG. 6 is a fourth alternate embodiment.

Another embodiment is shown in FIG. 6. The device may be in the form of a spray attachment for a hose 19 having a threaded hose end 21 wherein the spray attachment has a suction cup 1 having a face attachable to a slick surface such as the outer surface of a car or boat, a flexible, receiving cap 2 defining a flexible cylindrical opening 22 attached to the suction cup 1; a beveled end 6, insert-able within the cylindrical opening 22; a retaining means for releasably retaining the beveled end 6 within the cylindrical opening 22 wherein the retaining means is the frictional contact between the walls of the flexible cylindrical opening; and the walls of the beveled end 6 and a sprayer 17 attached to the beveled end; said sprayer 17 having a threaded opening 20 for receiving the threaded hose end (not shown).

The sprayer 17 and beveled end 6 are attached to the 3 way fitting 16 by threaded fittings 36.

The rim 34 of the beveled end 6 shown in FIG. 6 expands outward so that the rim 34 may contact the inside walls of the cylindrical opening 22 of the receiving cup 2 to further leverage the frictional contact which is enhanced by the compression of the flexible walls 37 when the beveled end 6 is inserted within the opening 22.

While any type of sprayer 17 may be used, the type of sprayer 17 shown on FIG. 6 has an adjustable stream as is known in the art.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A spray attachment for a hose having a threaded cap attachable to a slick surface comprising:
   a) a spray attachment;
   b) an attachment means for releasing and gripping the spray attachment;
   c) a suction cup attachable to the slick surface and attachable to the attachment means so as not to interfere with the releasing and gripping of the spray attachment and wherein the suction cup further comprises an insertion cap with an opening having an opening diameter; the attachment means having a rim at an insertion end with a diameter at least the size of the opening diameter so that when the rim is inserted within the opening the frictional contact between the cap and the rim holds the rim within the opening and wherein the attachment means is beveled and has a length along the bevel and wherein the bevel has a diameter less than the diameter of opening adjacent the rim and then diverges to a diameter greater than the opening along the length of the bevel.

2. The invention of claim 1 wherein the opening is a cylindrical opening and further comprising at least one flexible protrusion within the opening which contacts frictionally the rim when the rim is inserted within the opening.

3. The invention of claim 1 wherein the spray attachment further comprises a valve for alternately allowing spray from the spray attachment and closing the spray attachment.

4. The invention of claim 1 wherein the spray attachment further comprises a threaded cap for receiving the hose.

5. A spray attachment for a hose having a threaded cap attachable to a slick surface comprising:
   a) a spray attachment;
   b) an attachment means for releasing and gripping the spray attachment;
   c) a suction cup attachable to the slick surface and attachable to the attachment means so as not to interfere with the releasing and gripping of the spray attachment and wherein the suction cup further comprises an insertion cap with an opening having an opening diameter; the attachment means having a rim at an insertion end with a diameter at least the size of the opening diameter so that when the rim is inserted within the opening such that the frictional contact between the cap and the rim holds the rim within the opening and wherein the rim has a distal diameter greater than the diameter of the opening and wherein the rim is flexible so that the rim flexes inward and grips the insertion cap;
   d) a retaining means for releasably retaining the rim within the opening attached to the insertion cap, and wherein said spray attachment has a threaded opening for receiving the threaded cap.

6. The invention of claim 5 wherein the attachment means has an expanded end insertable within the opening.

* * * * *